March 30, 1965
I. JEPSON ETAL
3,175,594
DISINTEGRATOR AND MIXER
Filed Oct. 23. 1961
4 Sheets-Sheet 1
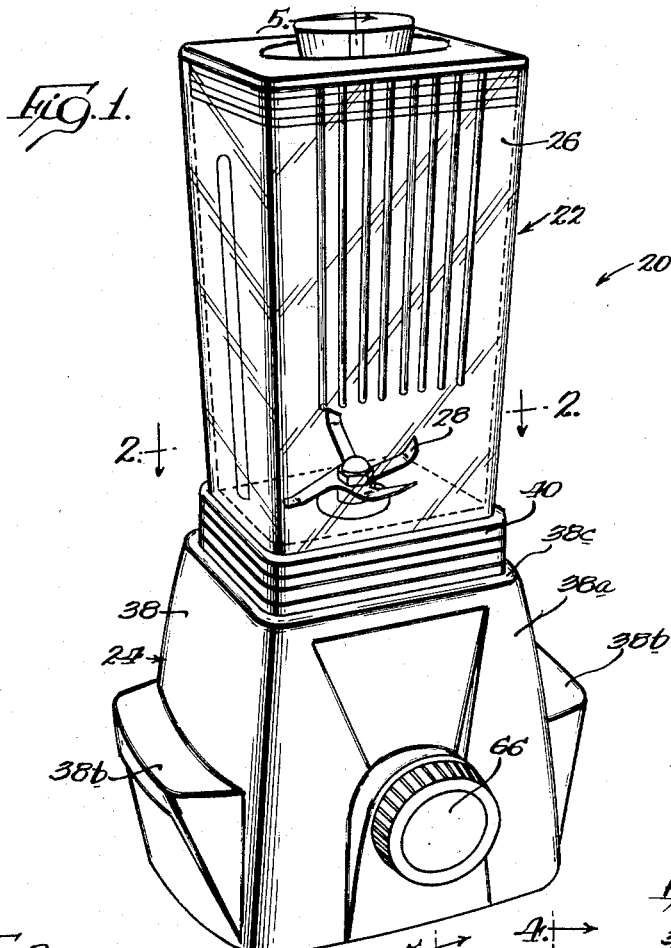
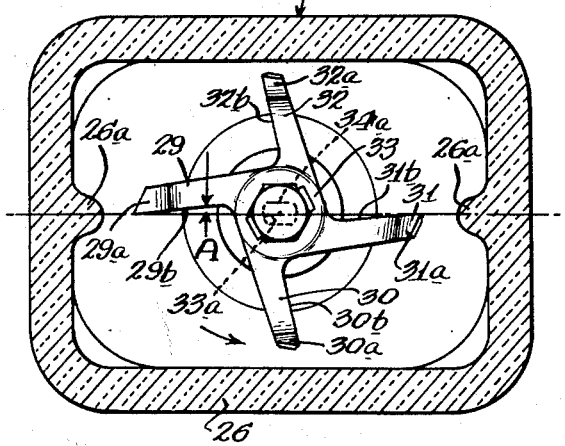
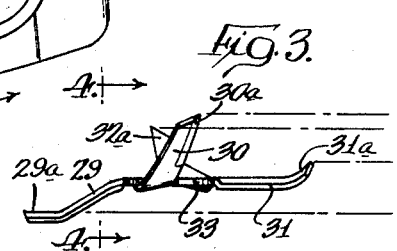
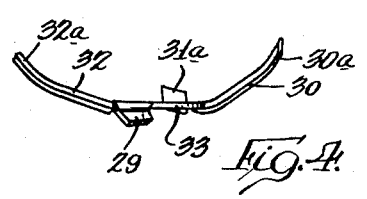
INVENTORS:
Ivar Jepson
Gilbert R. Wolter
Herman O. DeBoer, Jr.
By George R. Clark
Atty

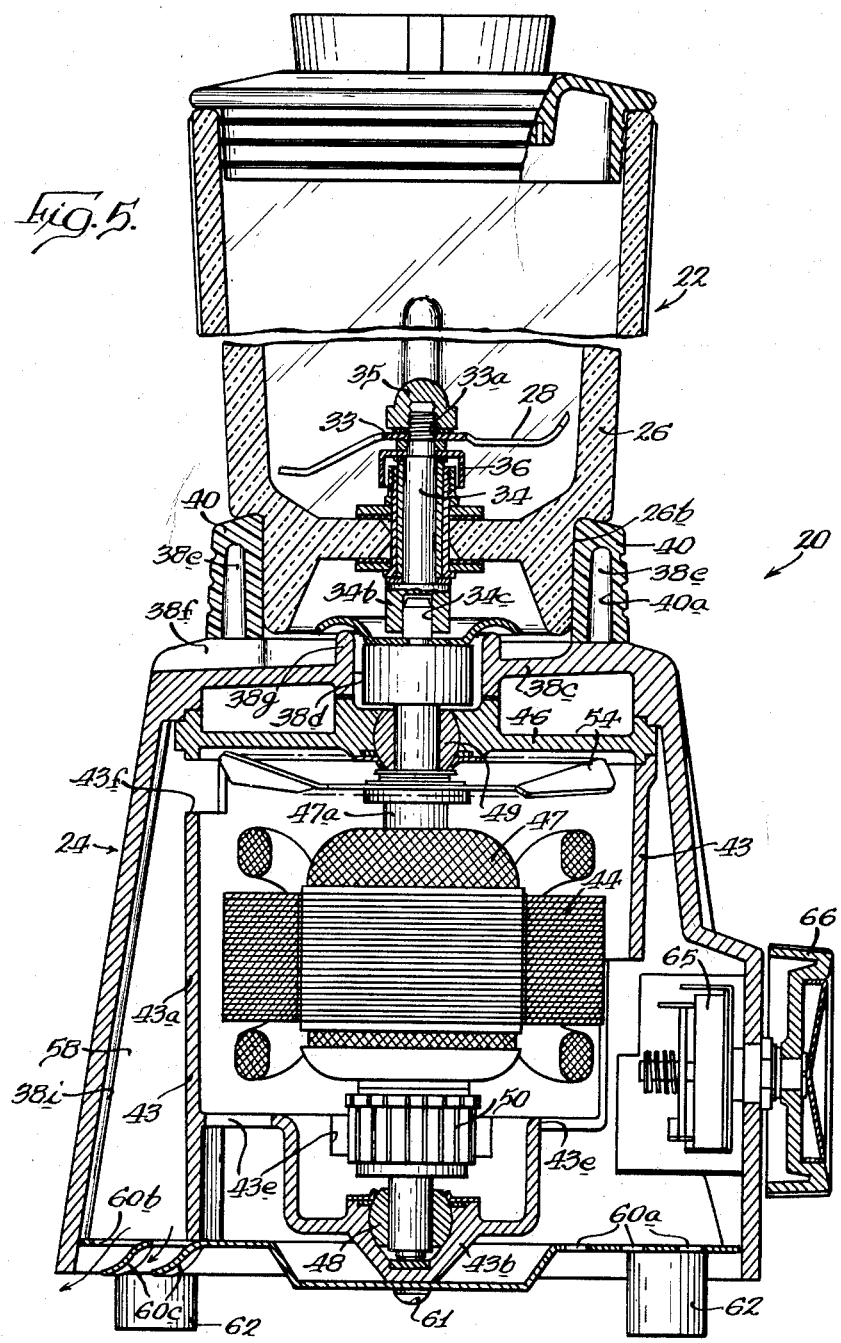

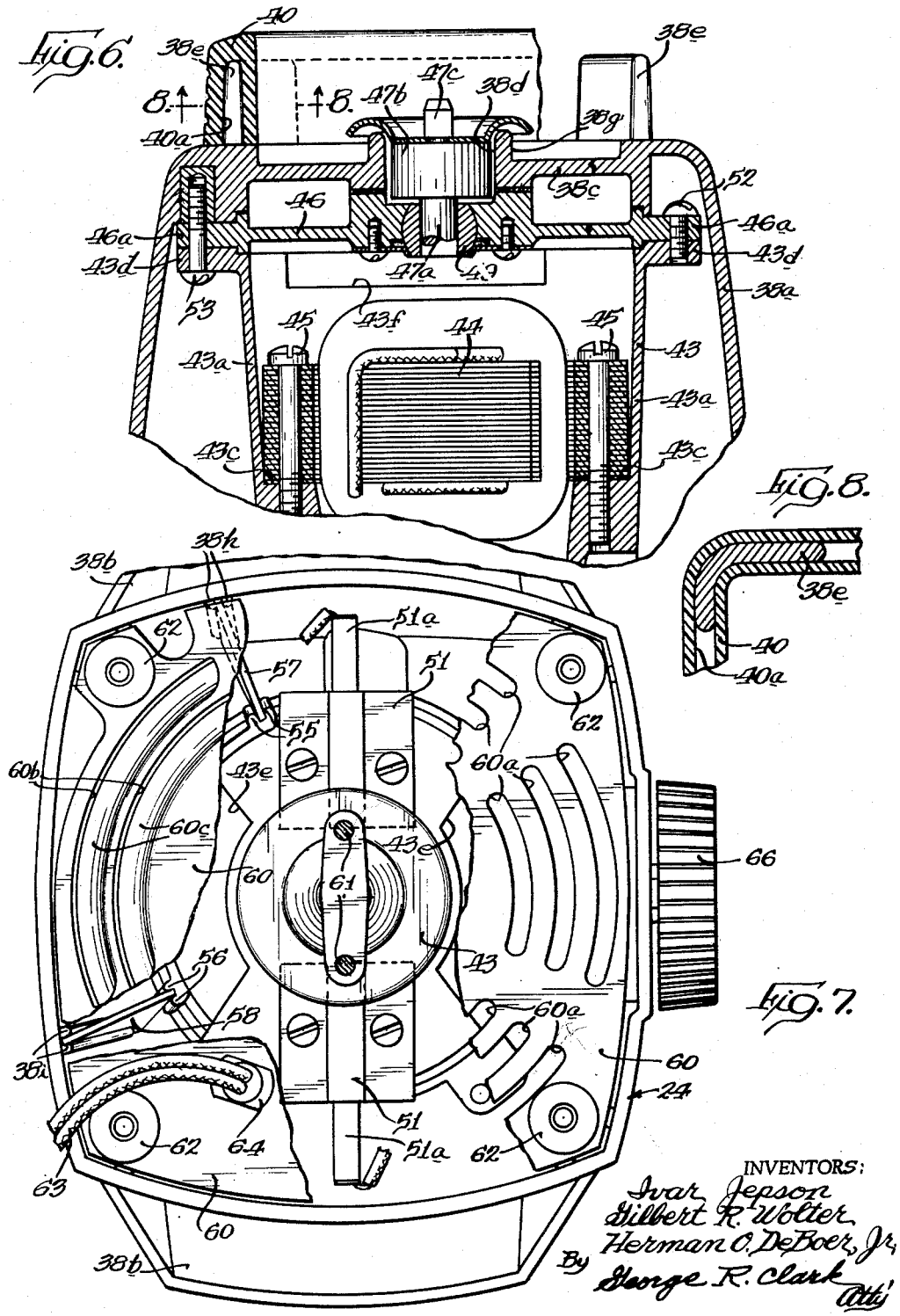

March 30, 1965 I. JEPSON ETAL 3,175,594
DISINTEGRATOR AND MIXER
Filed Oct. 23, 1961 4 Sheets-Sheet 4

INVENTORS:
Ivar Jepson
Gilbert R. Wolter
Herman C. DeBoer, Jr.
By George R. Clark Atty

United States Patent Office 3,175,594
Patented Mar. 30, 1965

3,175,594
DISINTEGRATOR AND MIXER
Ivar Jepson, Oak Park, Gilbert R. Wolter, Elmhurst, and Herman O. De Boer, Jr., Wheaton, Ill., assignors to Sunbeam Corporation, Chicago, Ill., a corporation of Illinois
Filed Oct. 23, 1961, Ser. No. 147,350
9 Claims. (Cl. 146—68)

The present invention relates to a food or liquid mixer and more particularly to a blender of the type having an open topped vessel within which a power driven mixing and chopping blade is rotatably supported.

The blender as it is known today includes a motor driven power unit having a vertically disposed spindle extending upwardly from a motor housing. The housing includes means for detachably supporting a vessel within which a blade is rotatably mounted. A coupling member extends through the bottom of the vessel and is adapted to be drivingly engaged by the spindle on the power unit. The blade positioned within the open topped vessel is characteristically provided with a number of sharp cutting blades which are designed to chop up any solid foods placed in the vessel and to create a turbulent mixing action in the liquids or solids placed in the vessel. In that the device is designed to chop up and mix materials such as ice, vegetables, fruits and other solid foods, a motor of between a one-third and one-half horse power is necessary for the power unit.

In view of the substantial power requirements for the motor as well as the problems presented by foods and, particularly liquids, in the area of the power unit, adequate cooling of the power unit has presented a serious problem. Of necessity, the blade is rotated at an extremely high speed to achieve satisfactory mixing and comminuting of the materials placed in the vessel. In spite of the provision of a lid for the vessel, liquids are frequently forced out of the vessel or spilled during the loading or unloading of the vessel. Because of the likelihood of food being spilled on the power unit, it is undesirable to have any openings for motor cooling air positioned on the top or sides of the housing for the power unit. It would be desirable, therefore, to have a housing for the power unit with no openings on the top or sides thereof except the opening for the power connection necessary to drive the blade within the vessel.

In connection with the mounting of the vessel with respect to the power unit, many of the prior art blenders employ a plurality of small projections which engage the periphery of the base of the blender vessel to detachably support the vessel thereon. Because of the limited engagement of such projections with the vessel, they provide less than adequate support. It would be desirable, therefore, to have a continuous support around the base of the blender vessel which would provide more adequate support for the vessel while at the same time permitting its easy detachment from the power unit.

The design of the mixing and cutting blade itself is extremely important to the proper functioning of the blender. Even if the unit has adequate power and the blade is rotated at a high enough speed, it will not satisfactorily chop up and/or mix the contents of the vessel unless the material positioned in the vessel feeds into the blade properly. The high speed of the blade has a tendency to cause the blade to form a cavity in certain types of foods and prevent their feeding into the blade. A good example of a difficult food to comminute properly in a blender is the carrot. When a number of carrots are placed in the vessel and the blender is turned on, the blade often chops only the few carrots which are in the immediate area of the blade leaving the remainder of the vessel filled with undisturbed and unchopped carrots. It would be desirable, therefore, to have a blade which would cause even solid materials to feed downwardly into the blade where they may be chopped up and mixed with the entire contents of the vessel.

Accordingly it is an object of the present invention to provide a new and improved blender having the various desirable features set forth above.

It is another object of the present invention to provide a blender having a power unit enclosed in a housing having no openings except in the bottom thereof for the intake and outlet of motor cooling air.

It is a further object of the present invention to provide an improved means for detachably mounting the blender vessel on the power unit.

Still another object of the present invention is to provide a blade for a blender which improves the feeding of solid materials into the blade.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of a blender built in accordance with the present invention;

FIG. 2 is an enlarged sectional view of the blender vessel taken along line 2—2 of FIG. 1;

FIG. 3 is a side elevational view of the blade shown in the blender vessel of FIGS. 1 and 2;

FIG. 4 is a sectional view of the blade taken along line 4—4 of FIG. 3;

FIG. 5 is an enlarged sectional view taken along line 5—5 of FIG. 1;

FIG. 6 is an enlarged fragmentary vertical sectional view of the blender power unit with the motor armature and a portion of the vessel mounting gasket removed;

FIG. 7 is an enlarged bottom plan view of the blender of FIG. 1 showing portions of the bottom closure plate cut away;

FIG. 8 is a fragmentary sectional view taken along line 8—8 of FIG. 6;

Figure 9:
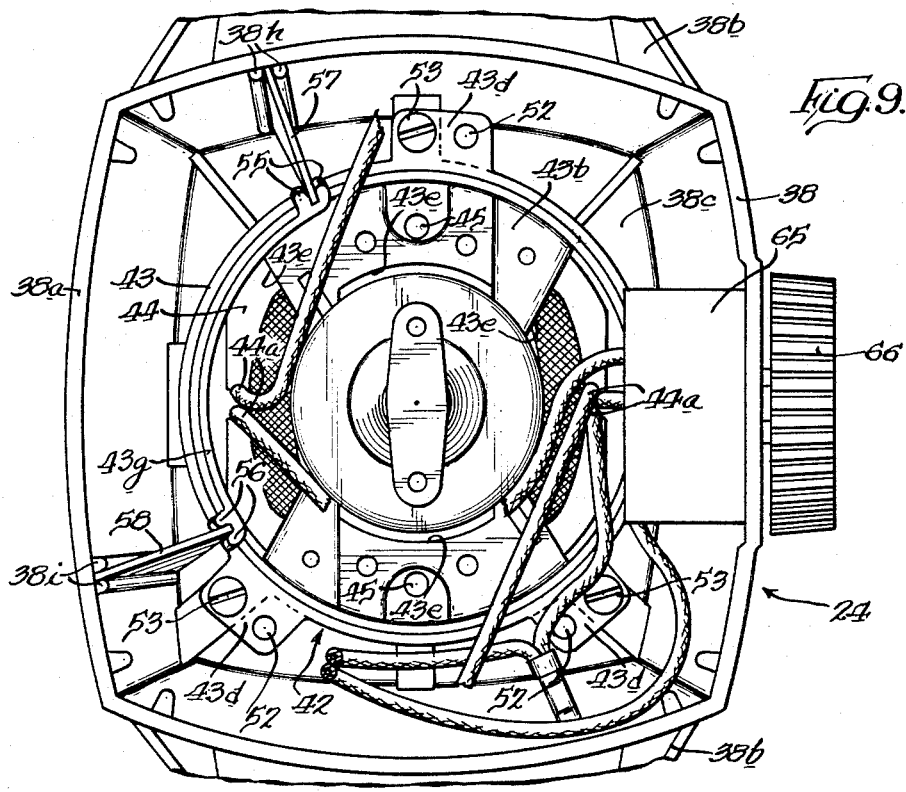
FIG. 9 is a bottom plan view of the blender with the bottom cover plate and brush supporting assemblies removed to expose the motor and housing interior.

Briefly the present invention is concerned with a blender having an improved cutting and mixing blade mounted within an open topped vessel. The power unit for the blender is provided with a simple cooling arrangement which obviates the needs for any openings in the top or side wall of the housing while preventing recirculation of the cooling air. The motor cooling air is drawn up through the bottom opening in the housing and discharged through a downwardly extending passageway formed between the motor frame and a portion of the housing wall. A continuous gasket means is provided to support the vessel on the power unit while liquid drainage means are provided to prevent liquid from accumulating in the area of the power take-off. The mixing and chopping blade has four blade members positioned at different angles of inclination to achieve a maximum engagement with the contents of the vessel and having the outer ends thereof projecting forwardly to achieve a piercing action on the body of food in the vessel. In addition the four blades are spaced apart unequal distances to achieve better feeding of the contents into the blade.

Referring now to the drawings, there is illustrated a blender generally indicated at 20 which comprises an open topped vessel 22 within which the food to be treated is placed and a power unit 24 to which the vessel 22 may be detachably connected. The blender vessel 22 comprises an open topped glass jar 26 and a cutitng blade 28 rotatably supported therein. The glass jar 26 has a generally rectangular cross section as may be best seen in FIG. 2. When the contents of the jar 26 is acted upon by the rotating blade 28, the rectangular cross section of the jar and vertically extending ribs 26a create turbulence. Were it not for the rectangular cross section and the ribs 26a, the contents of the jar would tend to rotate as a unitary mass rather than being thoroughly mixed. The shape of the blender vessel as well as the manner in which the cutting blade is mounted is discussed in detail in Jepson Patent No. 2,896,924 assigned to the same assignee as the instant application. As is conventional in blenders, the blade 28 is intended to draw the contents of the jar 26 downwardly into the blade where the contents are chopped up and mixed being discharged downwardly and toward the sides. There tends to be a continuous flow of material downwardly at the center and upwardly around the sides of the vessel.

To accomplish the chopping and circulation of the contents, the blade 28 is formed with four radially extending blade members 29, 30, 31 and 32 which extend outwardly from a flat centrally disposed hub 33. As may best be seen in FIGS. 3 and 4, the blade members all extend outwardly at different angles to the hub 33. Blade 29 extends downwardly with respect to the hub while blade 31 extends substantially horizontally. Blade members 30 and 32 are directed upwardly at different angles with respect to hub 33. The tips of each of the blade members are angled with respect to the remainder as indicated at 29a, 30a, 31a and 32a. As a result of the uniform length of the blade members and the inclination of the blade members and the tips 29a, 30a, 31a and 32a, the outer ends of the blade members are at different radial distances from the axis of blade 28. To insure a satisfactory chopping action and to reduce the amount of power necessary, the leading edges of the blade members are provided with sharpened edges 29b, 30b, 31b and 32b. The blade members are angled upwardly toward the cutting edges to insure a propeller-like action in drawing the contents of the vessel downwardly toward the blade 28. The sectional showing of blade member 29 in FIG. 4 illustrates this angling toward the cutting edge.

It has been found that there is a tendency for a rapidly rotating blade to throw the cut material outwardly therefrom and to form a pocket within which the blade rotates without causing more material to feed into the blade. The instant invention involves several changes which have been made in the blade design to overcome this deficiency. First, the positioning of the blade members 29, 30, 31 and 32 at different angles with the tips 29a, 30a, 31a and 32a rotating in different planes causes the blade to engage a maximum amount of the vessel contents. Secondly, the cutting edges 29b, 30b, 31b and 32b have been arranged so that the outer ends thereof are leading the remainder of the cutting edges. As a result, the outer ends of the blade members tend to pierce the adjacent food mass drawing it into the blade where it may be chopped up. This piercing action presents a substantial advantage over the slicing action which has characterized the former blade design. To illustrate the geometrical relationship between the edges of the blade members and the axis of rotation of blade 28, a dotted radial line has been drawn in FIG. 2 through the axis of rotation of blade 28, intersecting the tip of blade member 29. The angle A between the sharpened edge 29b and this radial line was on the order of two degrees in one constructed embodiment.

In addition it should be noted that the blade members 29, 30, 31 and 32 are not equally spaced around the hub 33. There are less than 90 degrees between blade members 29 and 32 while the blade members 29 and 30 are separated by more than 90 degrees. Similarly, blade member 31 is closer to blade member 30 than to blade member 32. As a result, there are greater spaces between blades 31, 32 and 29, 30 than there are between the pairs of blades 29, 32 and 30, 31. This displacement of the blades from the normal equal angular positioning also improves the feeding of food downwardly into the blade. Apparently a pulsating action is achieved as the blade rotates, thus causing the food to continue to feed downwardly rather than forming a cavity around the blade.

The blade 28 is rotatably supported in the jar 26 on a shaft 34 which is journalled in the base of the jar 26. Suitable bearing means for the shaft 34 and sealing means for the bearing are described in detail in the above-cited Jepson patent. The upper end of the shaft 34 is threaded and formed with flatted portions 34a which cooperate with corresponding flatted portions in the opening 33a in the hub portion 33. A suitable retaining nut 35 is threadedly received on the upper end of shaft 34 to secure the blade 28 on the end of shaft 34. Also clamped to the end of shaft 34 and rotatable with the blade 28 is a cup-shaped member 36 which prevents the liquid contents of the jar 26 from leaking out of the vessel along the shaft 34.

To drivingly relate the power unit 24 and the blade 28, the lower end of the shaft 34 is provided with an integrally formed coupling member 34b. The coupling member 34b is formed with a recess 34c having vertically extending serrations or grooves which are adapted to be drivingly engaged by the output shaft of power unit 24.

The power unit 24 is housed within a plastic housing 38 which is of inverted cup-shaped configuration. The power unit is substantially rectangular in horizontal section at its upper edge with side walls 38a extending downwardly therefrom being rounded somewhat to approach a cylindrical configuration. Molded integrally with the side walls 38a are handles 38b which may be used in transporting the power unit 24. The top of the housing 38 is defined by a substantially horizontal top wall 38c through which the driving connection between the motor and the blade in the vessel 22 extends. Since there is always a substantial possibility of foods and liquids being spilled on the housing 38, there are no upwardly facing openings in housing 38 except an opening 38d through which the power connection to the blade extends.

To removably support the blender vessel 22 on the power unit 24, the lower edge of the jar 26 is formed with a substantially rectangular shouldered projection 26b best shown in FIG. 5. The shouldered projection 26b is gripped or received by a gasket or retaining member 40 which is rectangular in configuration to conform to projection 26b. The gasket 40 may be made of rubber or any suitable resilient plastic material. Extending upwardly along the entire length of the gasket 40 is a groove 40a. The groove 40a is designed to permit assembly of the gasket 40 to the power unit housing 38. Projecting upwardly from the corners of the top wall 38c of housing 38 are four projections 38e which engage the gasket or retaining member 40 in the area of the groove 40a. As best shown in FIG. 8, the projections 38e are substantially L-shaped in horizontal section and are positioned at the corners of the rectangular gasket 40. The projections 38e, therefore, not only retain the gasket 40 assembled to the power unit housing 38 but also provide a rigid support for the gasket 40 so that the lower edge of the glass jar 26 may be suitably gripped when assembled to the power unit 24.

While the projections 38e are spaced from one another, the gasket 40 extends completely around the top wall 38c of housing 38 to form a pocket within which the rectangular shouldered portion 26b of the glass jar 26 is received. To prevent the entrapment of spilled liquids within this pocket where they might ultimately enter the housing 38 through the opening 38d, a drainage groove 38f is provided which extends beneath the gasket 40 and angles downwardly from a peripheral flange 38g extending around the opening 38d as is illustrated in FIG. 5. Thus, any liquids spilled on the housing top wall 38c are prevented from entering the opening 38d by the flange 38g and are rapidly drained away through the slot 38f.

As a part of the power unit 24, there is mounted within the housing 38 an electric motor 42. The motor 42 includes a cup-shaped frame member 43 having cylindrical side walls 43a and a bottom bearing supporting wall 43b. The side walls 43a of the motor frame are formed with supporting shoulders 43c on which a laminated motor field 44 is supported by means of bolts 45 which extend downwardly into the threaded engagement with the shoulders 43c. Received on the upper end of the cup-shaped frame member 43 is an upper bearing supporting plate 46. An armature 47 carried by a shaft 47a is mounted for rotation about a vertical axis in bearings 48 and 49 which are received in the supporting wall 43b and the supporting plate 46, respectively. Rotatable with the armature 47 is a commutator 50. The bottom bearing supporting wall 43b carries brush supporting assemblies 51 which are conventional in design including brushes resiliently mounted for engagement with commutator 50. The cup-shaped frame member 43 and the upper bearing supporting plate 46 are formed with assembly flanges 43d and 46a, respectively, through which suitable assembly screws 52 extend to retain the frame 43 and the supporting plate 46 in assembled relation. Adjacent each of the assembly screws 52, there is provided a motor assembly screw 53 which extends upwardly into threaded engagement with a metallic insert molded integrally into the cup-shaped housing 38 to assemble the motor 42 thereto. The upper end of the armature shaft 47a has attached thereto a resilient coupling bushing 47b which is positioned within the opening 38d in the housing 38. Projecting from the top of bushing 47b is a lower coupling member 47c which is adapted to drivingly engage the upper coupling member 34b. Coupling member 47c has a square horizontal cross section and is tapered slightly at the upper end to facilitate insertion into the recess 34c in the upper coupling member 34b. The corners formed by the flat sides of member 47c engage the serrations in the recess 34b to drivingly interconnect the coupling members as is conventional in appliances of this type.

To circulate cooling air through the motor 42, there is mounted at the upper end of the armature shaft 47a immediately below the bearing 49 a fan 54. The fan 54 is rotated in such a direction to draw air upwardly through the motor 42 and discharge it radially of the axis of the armature shaft 47a. At the lower end of the motor 42, there are openings 43e formed in the frame member 43. At the upper end of the motor 42, however, the cylindrical side walls 43a cooperate with the upper bearing supporting plate 46 to form a completely closed housing with the exception of an opening 43f which extends around approximately one-quarter of the periphery of the frame member 43. Thus, the cooling air is drawn in over a substantial area of the bottom of the motor 42 through the openings 43e while the discharge from the upper end of the motor 42 is limited by the extent of the opening 43f.

Figure 10:
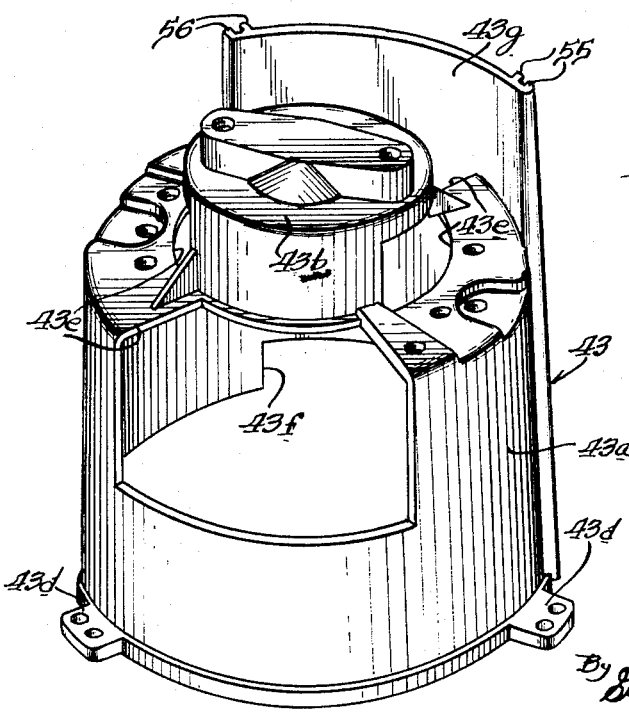
FIG. 10 is a bottom perspective view of the motor frame of the blender.

Extending vertically downwardly along the outer face of walls 43b are two pairs of ridges 55 and 56 best shown in FIGS. 7, 9 and 10. The ridges 55 and 56 extend downwardly from a point adjacent the edges of the opening 43f. The ridges 55 and 56 define between them narrow grooves which receive air baffles 57 and 58, respectively. The spaced walls of the cup-shaped housing 38 are formed with corresponding ridges 38h and 38i. The air baffles 57 and 58 are inserted upwardly into the slots formed by the ridges 55, 56, 38h and 38i to form an air discharged passageway between the cylindrical side wall 43a of the motor and the side wall 38a of the power unit housing. To make the motor frame 43 co-extensive with the side walls 38a, the frame 43 is formed with a wall portion or extension of cylindrical section which terminates just short of the mouth of the cup-shaped housing 38. The wall portion 43g is merely a continuation of side wall 43a to complete the passageway formed by the baffles 57, 58.

To complete the power unit housing, there is provided a lower closure plate 60 which is retained in assembly with the cup-shaped housing by means of screws 61 which extend through openings in the closure plate 60 into threaded engagement with the motor frame member 43. The closure plate 60 is formed with a plurality of air inlet openings 60a through which air may be drawn upwardly into the housing 38 for cooling the motor 42. The closure plate 60 also serves to retain the air baffles 57 and 58 in position in the grooves defined in the motor frame 43 and the housing 38. The baffles 57, 58 are substantially trapezoidal in shape with their base portions adjacent plate 60 being larger than their respective widths along their uppermost edges. This design facilitates the upward insertion of the baffles into assembled relation to the housing 38 and the motor frame 43.

The closure plate 60 is also formed with air discharge openings 60b which are aligned with the air discharge passageway formed by the air baffles 57, 58, the motor frame 43 and the housing 38. To prevent the discharged air from merely being recirculated through the inlet openings 60a, inclined baffles 60c are provided which direct the discharged motor cooling air outwardly away from the axis of the motor 42 and the air inlet openings 60a as is shown in FIG. 5. To space the power unit 38 above a supporting surface, a plurality of rubber feet 62 are secured to the closure plate 60. With the housing 38 spaced above the supporting surface, the motor cooling air may be drawn in around the lower edge of the housing 38 and the air which has passed over the motor may be discharged through this same space.

A suitable power cord 63 enters the closure plate 60 through an opening within which a strain relief 64 is mounted. The power cord is connected to the motor 42 through a switch 65 which includes a manual operating knob 66 positioned outside of the housing 38.

As may best be seen in FIGS. 5 and 10, the openings 43e in the frame 43 represent a substantial portion of the motor frame which has been cut away at the lower end of the motor 42. By making the motor frame 43 in somewhat skeleton form, the problems of electrically interconnecting the field coils, the brushes and the switch 64 are simplified considerably. As is shown in FIG. 9, field leads 44a extend upwardly through the openings 43e for connection to the brushes, switch or power cord 63. As is also evident from comparing FIGS. 7 and 10, the other openings 43e permit the brush assemblies to be mounted exterior of the motor frame 43 with portions thereof extending through frame 43 into engagement with the commutator 50.

By restricting the area between the frame and the housing through which the cooling air is discharged downwardly from the upper end of housing 38, it is only necessary to have the cylindrical side wall of the motor frame 43 continuous and without openings therein over a relatively small area. In addition, by having the cooling air discharged on the side of the motor frame away from the switch and the field connections, the problem of separating the intake and discharge air from each other while at the same time drawing in and discharging the air from the bottom of the cup-shaped housing is simplified considerably. The only additional parts necessary for the sealed discharge from the upper end of the motor are the two baffles which are received in the integrally formed grooves in the motor frame in the housing.

In view of the detailed description included above, the operation of the blender 20 of the present invention will be readily understood. It will be appreciated that the configuration of the blade 28 is such that it will produce improved mixing and chopping action when used in any type of vessel. In addition, the arrangement of the motor within the housing may find application in any situation in which the intake and discharge of the motor cooling air may most advantageously be in the same area. This arrangement results in a motor and housing which is inexpensive to manufacture and of simple, sturdy construction.

While there has been illustrated and described one embodiment of the present invention, numerous changes and modifications are likely to occur to those skilled in the art, and it is aimed in the appended claims to cover all such changes and modifications as fall within the true spirit and scope of the invention.

What is claimed as new and desired to be secured by Letters Patent of the United States is:

1. A blender comprising an inverted cup-shaped housing, a vessel supported on said housing, a motor mounted within said housing having an armature shaft extending through an opening in the top of said housing, a support member enclosing said motor, said support member being secured at its upper end to said cup-shaped housing with side walls thereof spaced from the side walls of said housing, a fan carried by said armature shaft for drawing cooling air axially upwardly through said member, an air discharge passageway formed between said support member and said housing on one side of said motor and extending from the top of said cup-shaped housing to the bottom thereof, said passageway being formed by spaced walls extending between spaced portions of said support member and said housing, air inlet openings formed at the bottom of said member and a discharge opening at the top of said member opening into said passageway.

2. The blender of claim 1 having a closure plate for the mouth of said cup-shaped housing, said plate having air inlet and outlet openings formed therein, said outlet opening positioned adjacent the edge of said plate and in registry with said passageway.

3. The blender of claim 2 wherein said plate is formed with deflectors extending across said outlet openings to direct the air discharged from said housing away from said inlet openings.

4. A motor unit comprising an armature rotatably supported in vertically spaced bearings carried by a support member, a motor field carried by said member, a cooling fan mounted for rotation with said armature to force air through said motor, a cup-shaped housing within which said support member is mounted, with the walls of said housing spaced from the walls of said member, said member being formed with an air inlet and an air discharge opening, said fan drawing air in through the mouth of said housing into said air inlet openings and discharging said air from said member through said air discharge opening, a vertically extending discharge passageway formed on one side of said motor between said spaced walls along only a portion of the periphery of the housing, said passageway being in communication with said air discharge opening to discharge said cooling air through the mouth of said housing.

5. The motor unit of claim 4 having air deflection means at the discharge end of said passageway to prevent discharged air from being recirculated through said motor by said fan.

6. In a blender having an open topped vessel with a rotatable comminuting blade mounted therein with a driving connection extending through the bottom of said vessel, and a power unit having an upwardly extending driving member for coupling to said driving connection, the improvement comprising a motor having a frame supporting a stator and an armature rotatable about a vertical axis, means connecting said armature to said driving member, a housing having an upper motor supporting portion to the bottom of which the motor is secured with said driving member extending upwardly therethrough, said housing having side walls depending from the periphery of said supporting portion and defining a downwardly facing cavity within which said motor is enclosed, motor driven means for circulating cooling air into said cavity upwardly through said frame and said motor, a wall portion of said frame extending from said supporting portion to the mouth of said cavity, a pair of vertically extending baffle members positioned between said housing walls and said frame wall portion to define an air discharge passageway, and an opening defined in said frame in communication with said passageway through which motor cooling air is discharged downwardly from said housing.

7. A power unit for a blender comprising an inverted cup-shaped housing having generally cylindrical side walls, a motor having a frame within which a stator and armature are supported, said frame being cylindrical in shape with one end secured to the top wall of said housing and the side walls of said frame spaced from the side walls of said housing, fan means driven by said armature for forcing air into said housing and said frame, said frame having at least one air intake opening at the lower end thereof and at least one air discharge opening at the upper end thereof, a pair of baffles peripherally spaced along the inside of said housing side walls and positioned in vertical planes intersecting said armature axis to form with said housing and frame a vertically extending discharge passageway on one side of said housing in communication with said discharge opening, said baffles extending between said housing side walls and said side walls of said frame.

8. The power unit of claim 7 having a closure plate for the bottom opening in said housing, said plate having air inlet openings and air exhaust openings, said air exhaust openings in said plate being in communication with said discharge passageway and having baffles to direct the air away from said air inlet openings in said plate.

9. The power unit of claim 7 wherein said housing and said frame are provided with vertically extending slots for mounting said baffles, a closure plate for the bottom opening in said housing, said plate having air inlet and exhaust openings, said plate engaging the lower edges of said baffles and retaining said baffles assembled to said housing.

References Cited by the Examiner

UNITED STATES PATENTS

| | | | |
|---|---|---|---|
| 2,697,179 | 12/54 | Wendel | 310—62 |
| 2,744,203 | 5/56 | Collura | 310—91 |
| 2,761,659 | 9/56 | Collura | 259—108 |
| 2,771,111 | 11/56 | Seyfried | 146—68 |
| 2,788,038 | 4/57 | Corcoran | 146—68 |
| 2,868,025 | 1/59 | Spear. | |
| 2,897,862 | 8/59 | Malz et al. | |
| 3,051,856 | 8/62 | Hanschitz | 310—59 |

FOREIGN PATENTS

| | | |
|---|---|---|
| 966,457 | 8/57 | Germany. |
| 1,100,241 | 2/61 | Germany. |
| 650,869 | 3/51 | Great Britain. |

J. SPENCER OVERHOLSER, *Primary Examiner.*

JAMES S. SHANK, *Examiner.*